United States Patent
Gwin et al.

(10) Patent No.: US 9,547,339 B2
(45) Date of Patent: Jan. 17, 2017

(54) SMART FLEXIBLE DISPLAY

(71) Applicant: Intel Corporation, Santa Clara, CA (US)

(72) Inventors: Paul J. Gwin, Orangevale, CA (US); Mark E. Sprenger, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 125 days.

(21) Appl. No.: 14/227,655

(22) Filed: Mar. 27, 2014

(65) Prior Publication Data

US 2015/0277497 A1    Oct. 1, 2015

(51) Int. Cl.
*H01J 1/62* (2006.01)
*G06F 1/16* (2006.01)

(52) U.S. Cl.
CPC ............ *G06F 1/1652* (2013.01); *G06F 1/1681* (2013.01)

(58) Field of Classification Search
CPC .............................. G06F 1/1652; G06F 1/1681
USPC .......................................................... 313/511
See application file for complete search history.

(56) References Cited

U.S. PATENT DOCUMENTS

| | | |
|---|---|---|
| 2011/0241758 A1 | 10/2011 | Futter et al. |
| 2012/0126959 A1 | 5/2012 | Zarrabi et al. |
| 2012/0169184 A1 | 7/2012 | Pelrine et al. |
| 2014/0015402 A1 | 1/2014 | Ahn et al. |

FOREIGN PATENT DOCUMENTS

WO    01/91100 A1    11/2001

OTHER PUBLICATIONS

International Search Report and Written Opinion received for International Patent Application No. PCT/US2015/018489, mailed on May 27, 2015, 12 pages.
Office Action and Search Report received for Taiwanese Patent Application No. 104105358, mailed on Jun. 20, 2016, 14 pages including 6 pages of English translation.

*Primary Examiner* — Vip Patel
(74) *Attorney, Agent, or Firm* — Alpine Technology Law Group LLC

(57) ABSTRACT

In one example an electronic device, comprises a base section and a display connectable to the base section and comprising a flexible emissive projection display (EPD) layer, and an electroactive polymer (EAP) structure coupled to the EPD layer. Other examples may be described.

22 Claims, 11 Drawing Sheets

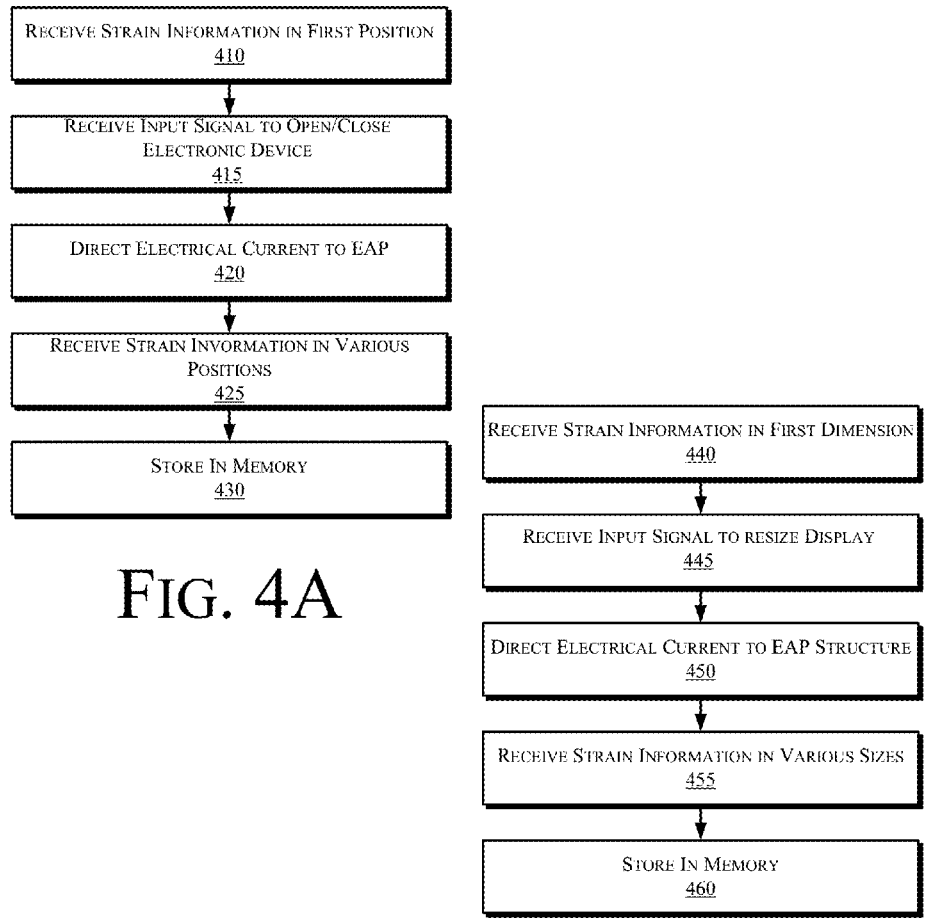

SMART FLEXIBLE DISPLAY

RELATED APPLICATIONS

None.

BACKGROUND

The subject matter described herein relates generally to the field of electronic devices and more particularly to a smart flexible display in electronic devices.

Electronic devices such as laptop computers, notebook computers, and the like comprise displays which are commonly coupled to a base section by a hinge assembly. The forces required to open and close the hinge require that the display be incorporated into a rigid frame structure, which in turn limits the degree to which the thickness of the display can be reduced and also limits the size of the display in the x-y plane to the dimensions of the frame. Accordingly additional display configurations may find utility.

BRIEF DESCRIPTION OF THE DRAWINGS

The detailed description is described with reference to the accompanying figures.

FIGS. 4A-4C are flowcharts illustrating operations in a method to implement a smart flexible display in accordance with some examples.

DETAILED DESCRIPTION

Described herein are exemplary systems and methods to implement a smart flexible display in electronic devices. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the particular examples.

As described above, it may be useful to provide electronic device displays with a smart flexible display. The subject matter described herein addresses these and other issues by providing a display which incorporates an electroactive polymer (EAP) structure into the display. A controller which may be coupled to the display includes logic to receive input signals from an input source and, in response to the signals, to activate the EAP structure in the display. In further examples the display may include a emissive projection display (EPD). In some examples the EAP structure may be activated in a region proximate where the display is coupled to the base of the electronic device to open or close the display, thus eliminating the need for a hinge assembly. In further examples the EAP structure may be activated to cause the display to expand or contract in an X-Y plane, making the viewing plane larger and or contracting and expanding preferentially to achieve a desired curvature of the screen or segment of the display.

Further structural and operational details will be described with reference to FIGS. 1-10, below.

Figure 1:
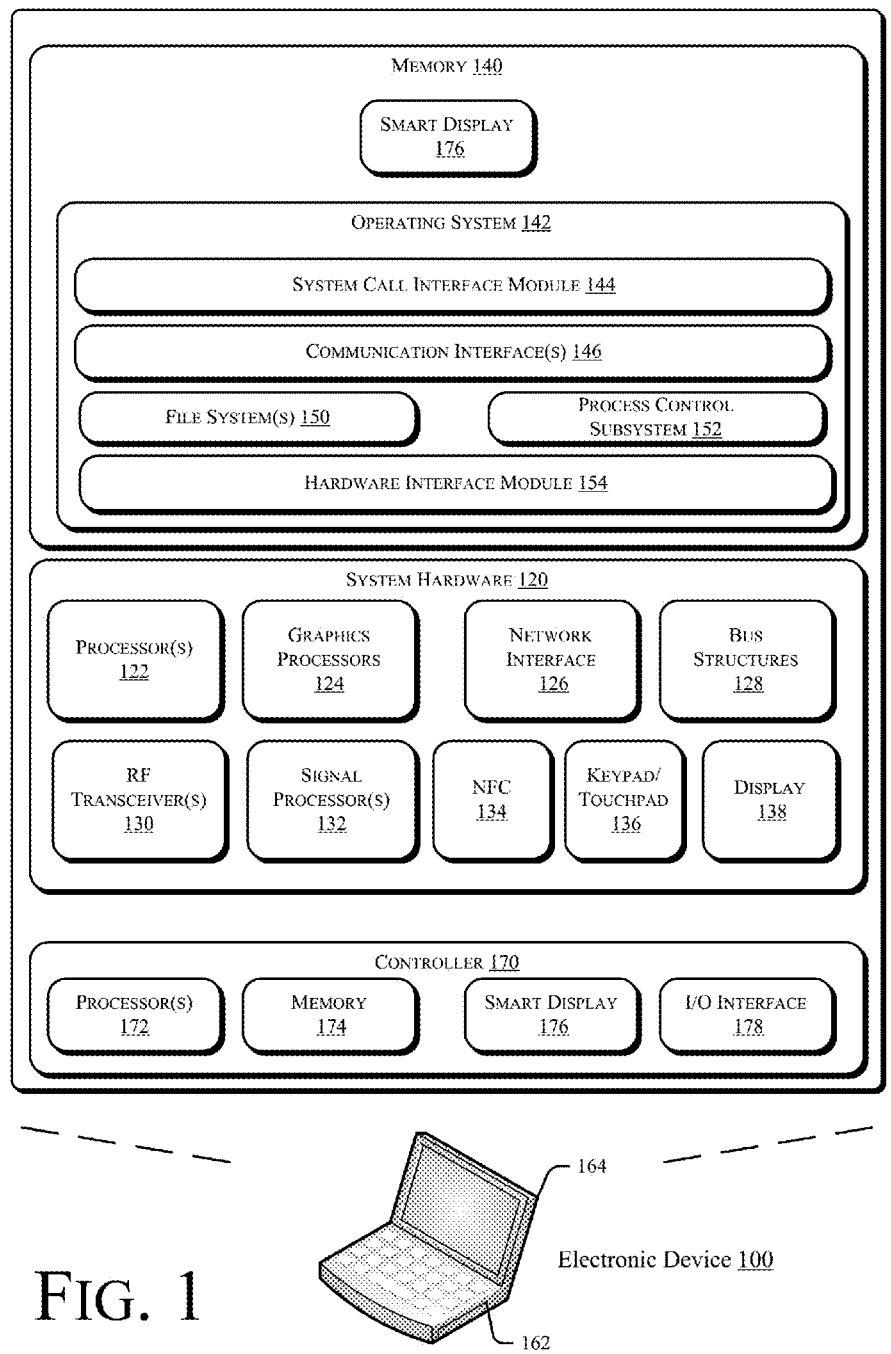
FIG. 1 is a schematic illustration of an electronic device which may be adapted to implement a smart flexible display in accordance with some examples.

FIG. 1 is a schematic illustration of an electronic device 100 which may be adapted to implement a smart flexible display in accordance with some examples. In various examples, electronic device 100 may include or be coupled to one or more accompanying input/output devices including a display, one or more speakers, a keyboard, one or more other I/O device(s), a mouse, a camera, or the like. Other exemplary I/O device(s) may include a touch screen, a voice-activated input device, a track ball, a geolocation device, an accelerometer/gyroscope, biometric feature input devices, and any other device that allows the electronic device 100 to receive input from a user.

The electronic device 100 includes system hardware 120 and memory 140, which may be implemented as random access memory and/or read-only memory. A file store may be communicatively coupled to electronic device 100. The file store may be internal to electronic device 100 such as, e.g., eMMC, SSD, one or more hard drives, or other types of storage devices. Alternatively, the file store may also be external to electronic device 100 such as, e.g., one or more external hard drives, network attached storage, or a separate storage network.

System hardware 120 may include one or more processors 122, graphics processors 124, network interfaces 126, and bus structures 128. In one example, processor 122 may be embodied as an Intel® Atom™ processors, Intel® Atom™ based System-on-a-Chip (SOC) or Intel® Core2 Duo® or i3/i5/i7 series processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 124 may function as adjunct processor that manages graphics and/or video operations. Graphics processor(s) 124 may be integrated onto the motherboard of electronic device 100 or may be coupled via an expansion slot on the motherboard or may be located on the same die or same package as the Processing Unit.

In one example, network interface 126 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 128 connect various components of system hardware 128. In one example, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI), a High Speed Synchronous Serial Interface (HSI), a Serial Low-power Inter-chip Media Bus (SLIMbus®), or the like.

Electronic device 100 may include an RF transceiver 130 to transceive RF signals, a Near Field Communication (NFC) radio 134, and a signal processing module 132 to process signals received by RF transceiver 130. RF transceiver may implement a local wireless connection via a protocol such as, e.g., Bluetooth or 802.11X. IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a WCDMA, LTE, general packet radio service (GPRS) interface (see, e.g., Guidelines on GPRS Handset Requirements, Global System for Mobile Communications/GSM Association, Ver. 3.0.1, December 2002).

Electronic device 100 may further include one or more input/output interfaces such as, e.g., a keypad 136 and a display 138. In some examples electronic device 100 may not have a keypad and use the touch panel for input.

Memory 140 may include an operating system 142 for managing operations of electronic device 100. In one example, operating system 142 includes a hardware interface module 154 that provides an interface to system hardware 120. In addition, operating system 140 may include a file system 150 that manages files used in the operation of electronic device 100 and a process control subsystem 152 that manages processes executing on electronic device 100.

Operating system 142 may include (or manage) one or more communication interfaces 146 that may operate in conjunction with system hardware 120 to transceive data packets and/or data streams from a remote source. Operating system 142 may further include a system call interface module 144 that provides an interface between the operating system 142 and one or more application modules resident in memory 130. Operating system 142 may be embodied as a UNIX operating system or any derivative thereof (e.g., Linux, Android, etc.) or as a Windows® brand operating system, or other operating systems.

In some examples an electronic device may include a controller 170, which may comprise one or more controllers that are separate from the primary execution environment. The separation may be physical in the sense that the controller may be implemented in controllers which are physically separate from the main processors. Alternatively, the trusted execution environment may logical in the sense that the controller may be hosted on same chip or chipset that hosts the main processors.

By way of example, in some examples the controller 170 may be implemented as an independent integrated circuit located on the motherboard of the electronic device 100, e.g., as a dedicated processor block on the same SOC die. In other examples the trusted execution engine may be implemented on a portion of the processor(s) 122 that is segregated from the rest of the processor(s) using hardware enforced mechanisms In the example depicted in FIG. 1 the controller 170 comprises a processor 172, a memory module 174, a smart frame module 176, and an I/O interface 178. In some examples the memory module 174 may comprise a persistent flash memory module and the various functional modules may be implemented as logic instructions encoded in the persistent memory module, e.g., firmware or software. The I/O module 178 may comprise a serial I/O module or a parallel I/O module. Because the controller 170 is separate from the main processor(s) 122 and operating system 142, the controller 170 may be made secure, i.e., inaccessible to hackers who typically mount software attacks from the host processor 122. In some examples the smart frame module 176 may reside in the memory 140 of electronic device 100 and may be executable on one or more of the processors 122.

Figure 2A:
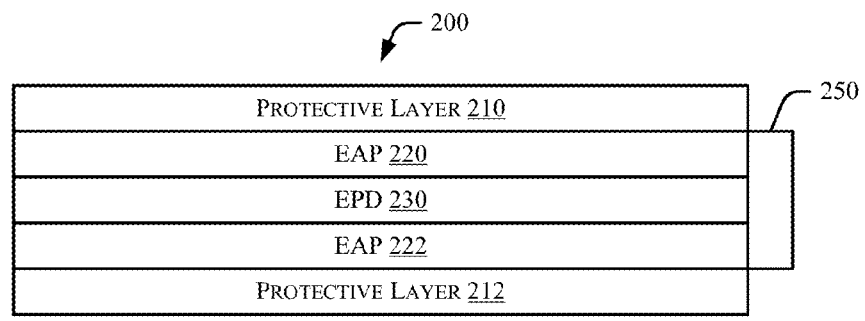
FIGS. 2A-2B are schematic cross-sectional illustrations of components of a smart flexible display in accordance with examples.
Figure 2B:
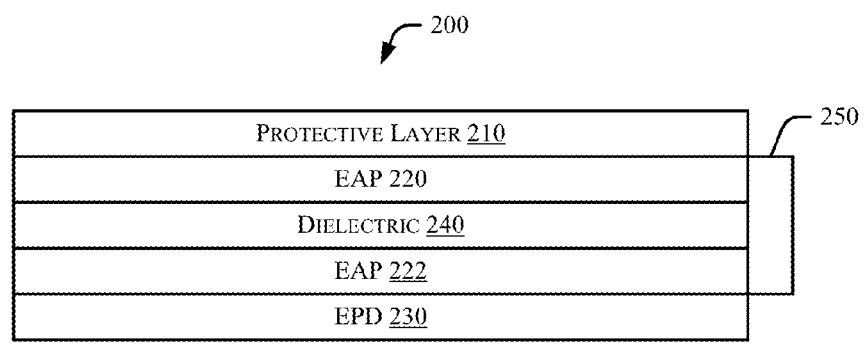

In some examples the electronic device 100 may comprise a display 200 which includes an EPD layer and a EAP structure coupled to the EPD layer. FIGS. 2A-2B illustrate examples of such display structures. Referring first to FIG. 2A, in some examples the display 200 comprises an EPD layer 230 which is disposed between a first EAP layer 220 and a second EAP layer 222. A first protective layer 210 is disposed adjacent the first EAP layer 220 and a second protective layer 212 is disposed adjacent the second EAP layer 222.

In the example depicted in FIG. 2B the display 200 comprises a dielectric layer 240 which is disposed between a first EAP layer 220 and a second EAP layer 222. A first protective layer 210 is disposed adjacent the first EAP layer 220 and an EPD layer 230 is disposed adjacent the second EAP layer 222. In alternate examples the display may comprise an organic light-emitting diode (OLED) display assembly.

In some examples the flexible EPD layer may comprise a multi-layer fluorescent screen structure which includes a red fluorescent film, a green fluorescent film, and a blue fluorescent film. The EPD layer may further include one or more layers formed from a material which absorbs ultraviolet (UV) radiation. When illuminated by an optical imaging system an image is formed on the fluorescent films. In some examples the EAP structure comprises the display panel and the outer layer of the EAP may contain emissive particles such that the emissive layer (EPD) acts as the insulating layer of the EAP structure.

The EAP layers 220, 222 may be formed from a suitable electroactive polymer material. Example of suitable materials include dielectric polymers, ferroelectric polymers, electrostrictve graft polymers, liquid crystalline polymers, and ionic polymers. In some examples the first EAP layer 220 has a positive electrical bias and the second EAP layer 222 has a negative electrical bias.

In some examples the protective layers 210, 222 may be formed from a suitable polymer such as silicone, or other amorphous elastomers with sufficient dielectric strength, glass, or other material.

One or more sensors such as, e.g., strain gauges 250 or radial potentiometers may be coupled to the display 200 to measure strain in the EAP layers 220, 222.

Figure 3:
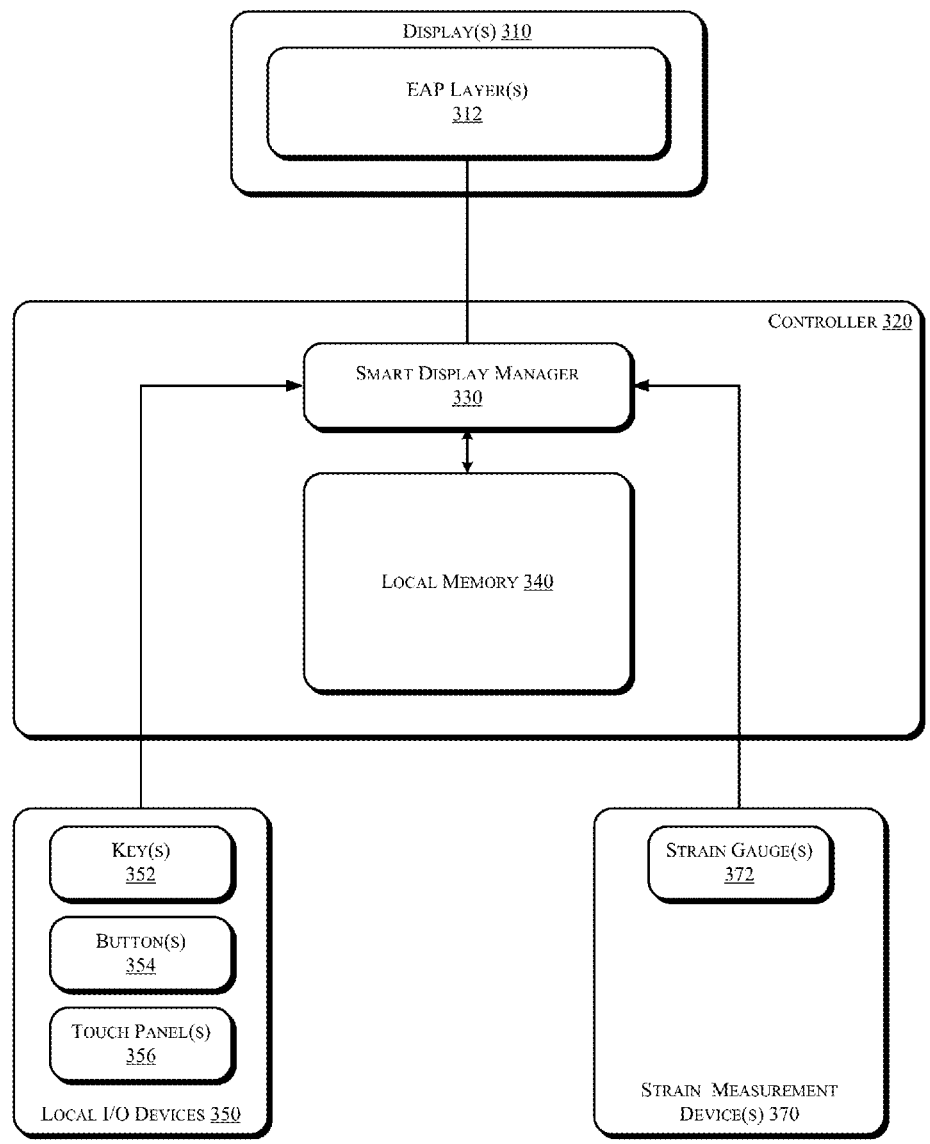
FIG. 3 is a high-level schematic illustration of an exemplary architecture to implement a smart flexible display in accordance with some examples.

In some examples the smart frame manager 176 interacts with one or more other components of the display to implement smart flexible display on the electronic device 100. FIG. 3 is a high-level schematic illustration of an exemplary architecture 300 to implement smart flexible display in electronic devices. Referring to FIG. 3, a controller 320 may be embodied as general purpose processor 122 or as a low-power controller such as controllers 170. Controller 320 may comprise a smart display manager 330 to manage smart display operations and a local memory 340. As described above, in some examples the smart display manager 330 may be implemented as logic instructions executable on controller 320, e.g., as software or firmware, or may be reduced to hardwired logic circuits. Local memory 340 may be implemented using volatile and/or non-volatile memory.

Controller 320 may be communicatively coupled to one or more local devices input/output (I/O) devices 350 which provide signals that indicate whether an electronic device is in motion or other environmental conditions. For example, local I/O devices 350 may include one or more key(s) 352, button(s) 354 or touch panels 356. Controller 320 may also be communicatively coupled to one or more strain measurement devices 370, which may include strain gauge(s) 372. Smart frame manager 330 may also be coupled to an EAP layer(s) 312 on display(s) 310.

Having described various structures of a system to implement a smart flexible display in electronic devices, operating aspects of a system will be explained with reference to FIGS. 4A, 4B and 5, which are flow charts illustrating operations in a method to implement a smart flexible display in electronic devices. The operations depicted in the flowcharts of FIGS. 4A, 4B and 5 may be implemented by the smart frame manager 330, alone or in combination with other component of electronic device 100.

Figure 5A:
FIGS. 5A-5E are schematic illustrations of components of an electronic device which incorporates a smart flexible display in accordance with some examples.
Figure 5B:
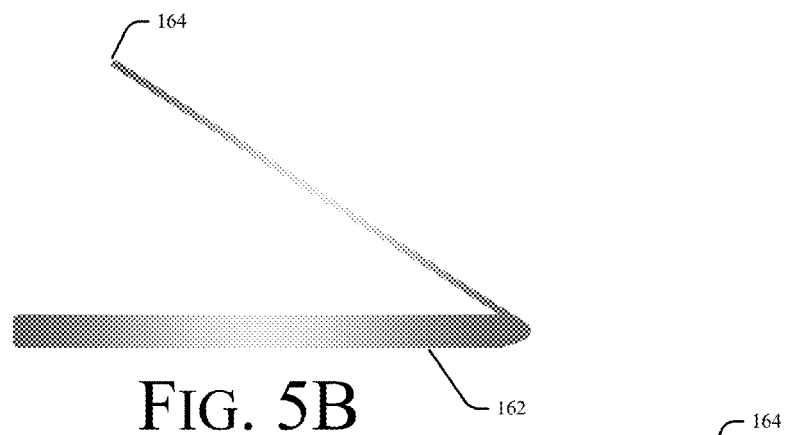
Figure 5C:
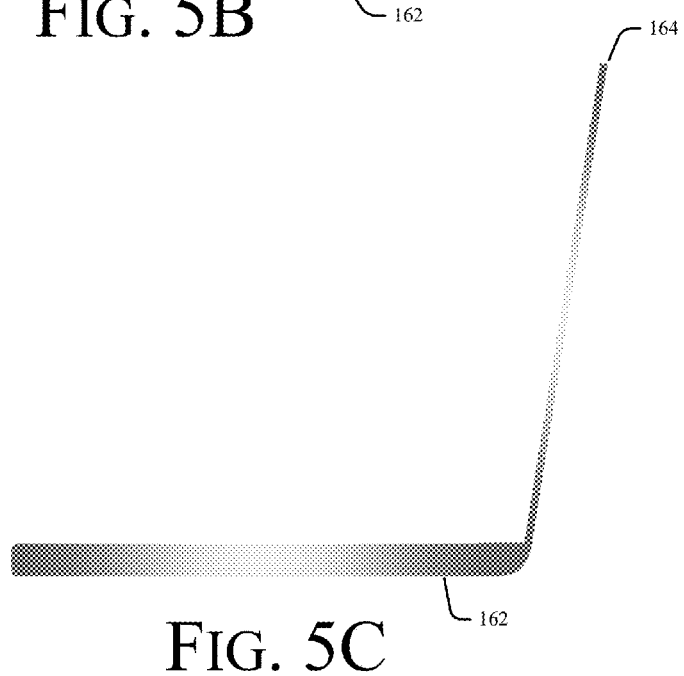
Figure 5D:
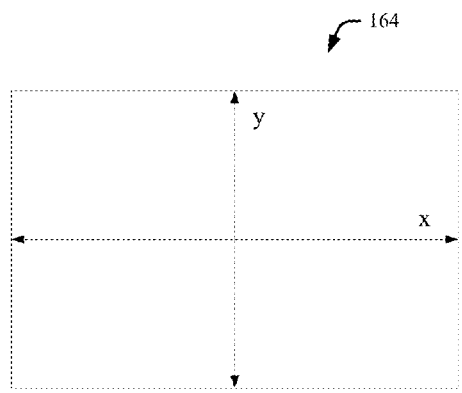
Figure 5E:
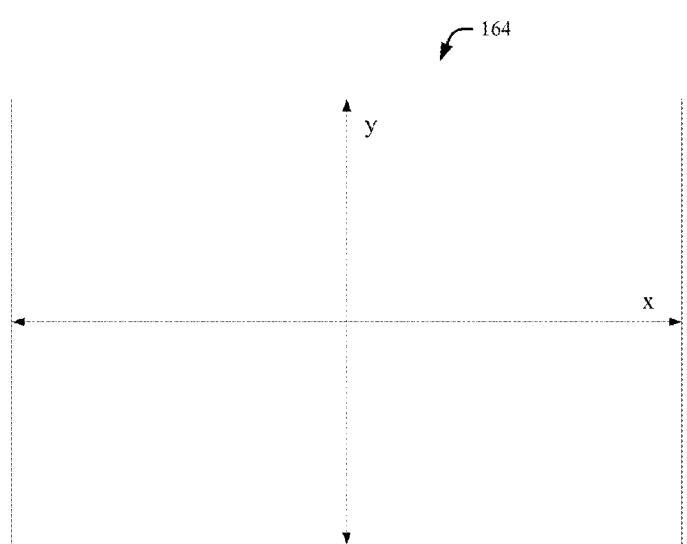

FIGS. 4A and 4B reflect operations performed in calibration procedures. Referring first to FIG. 4A, which depicts operations performed during a calibration procedure performed when the EAP layers are activated to open and close the display, at operation 410 the smart display manager 330 receives strain information when the display is in a first position. For example, the smart display manager 330 may monitor the strain gauge(s) 250 when the electronic device 100 is in a closed position, as illustrated in FIG. 5A. In some examples the EAP layers may comprise different regions. For example the region next to the base may be a band of EAP which may be activated separately from the to control the display rotation. The EAP layers in this region may have different properties than the EAP layers in the remainder of the display.

At operation 415 the smart frame manager 330 receives an input signal to open or close the electronic device 100. For example, the electronic device 100 may receive an input signal from one or more of the local input/output devices 350 to open the electronic device.

At operation 420, in response to the input signal the smart display manager directs electrical current to the electroactive polymer (EAP) layer(s) in the display. For example, if the input signal is to open the electronic device 100 then electrical current is directed to the EAP layer to cause a portion of the first EAP layer 220 to contract, thereby generating a torque which causes the electronic device 100 to open. By contrast, if the input signal is to close the electronic device 100 then electrical current is directed to the EAP layer to cause a portion of the second EAP layer 222 to contract, thereby generating a torque which causes the electronic device 100 to close. In further examples the strain gauge 250 or other sensor may be monitored to determine when a user applies a force to adjust the position of the display and in response the smart display module 176 may determine that it should not resist the strain and allows movement of the display and the position to stabilize at the end of the user displacement of the display. Similarly, in some examples in which the display comprises a touch screen the touch may be detected via the strain gauge 250 or other sensor and in response the smart display module 176 may dynamically adjust the strain in the EAP layer 220 to counteract the force of the touch.

At operation 425 the smart display manager 330 receives strain information with the electronic device 100 in various positions. For example, the smart display manager 330 may monitor the strain gauge(s) 250 as the electronic device is being opened and closed.

At operation 430 data from the strain gauges may be stored in memory, such as local memory 340. For example, the data from the strain gauge(s) 250 may be stored in a memory table in memory 340.

Thus, the operations depicted in FIG. 4A enable the smart display manager 330 to construct a data table in memory 340 which logs strain measurements measured by strain gauge(s) 250 as the electronic device 100 is being opened and closed.

In some examples the smart display manager 330 may implement a calibration procedure when the EAP layers are activated to increase or decrease the dimensions of the display in an XY plane. Referring to FIG. 4B, at operation 440 the smart display manager 330 receives strain information when the display is sized in a first dimension. For example, the smart display manager 330 may monitor the strain gauge(s) 250 when the electronic device 100 is sized as illustrated in FIG. 5A.

At operation 445 the smart frame manager 330 receives an input signal to resize the display. For example, the electronic device 100 may receive an input signal from one or more of the local input/output devices 350 to resize the display from a first dimension, depicted in FIG. 5D to a second dimension, depicted in FIG. 5E.

At operation 450, in response to the input signal the smart display manager directs electrical current to the electroactive polymer (EAP) layer(s) in the display. For example, if the input signal is to increase the size of the display 100 then electrical current is directed to the EAP layer to cause at least a portion of the EAP layers 220, 222 to expand in the XY plane, thereby increasing the size of the display. By contrast, if the input signal is to reduce the size of the display electrical current is directed to the EAP layer to cause a portion of the second EAP layer 222 to contract, thereby reducing the size of the display.

At operation 455 the smart display manager 330 receives strain information with the display in various sizes. For example, the smart display manager 330 may monitor the strain gauge(s) 250 as the size of the display electronic device is being increased and reduced.

At operation 460 data from the strain gauges may be stored in memory, such as local memory 340. For example, the data from the strain gauge(s) 250 may be stored in a memory table in memory 340.

Thus, the operations depicted in FIG. 4B enable the smart display manager 330 to construct a data table in memory 340 which logs strain measurements measured by strain gauge(s) 250 as the size of the display is being increased and reduced.

FIG. 4C depicts operations implemented by smart frame manager 330. At operation 470 the smart frame manager 330 receives an input signal to open/close the electronic device or to resize the display. At operation 475, in response to the input signal, the smart display manager directs electrical current to the electroactive polymer (EAP) layer(s) in the display to open/close the display or to resize the display.

In some examples the smart display manager 330 can use the data stored in the data table during the calibration operations to derive parameters relating to the current status of the display. For example, the smart display manager 330 can determine the position of the display and/or the shape and dimensions of the display by cross-referencing readings from the strain gauge(s) 250 with the data in the memory 340 collected during the calibration processes depicted in FIGS. 4A and 4B.

In further examples the smart display manager may implement a bounce control mechanism which uses an active feedback loop that senses a desired position, a displacement of the display due to touch inputs and frequency and measures motion as a function of time and responds with counter impulses to control the display bounce.

In further examples the drift in material properties (e.g., elastic modulus) over time may be determined by comparing a response of voltage to a known or physically verified display position. This may be part of a continuous calibration procedure. The display position may be verified by physical measurement with geometric methods external to the device, or may be by sensors within the device, such as optical sensors, mass sensors which detect the loading on feet indicative of the display mass balance, etc.

Figure 6:
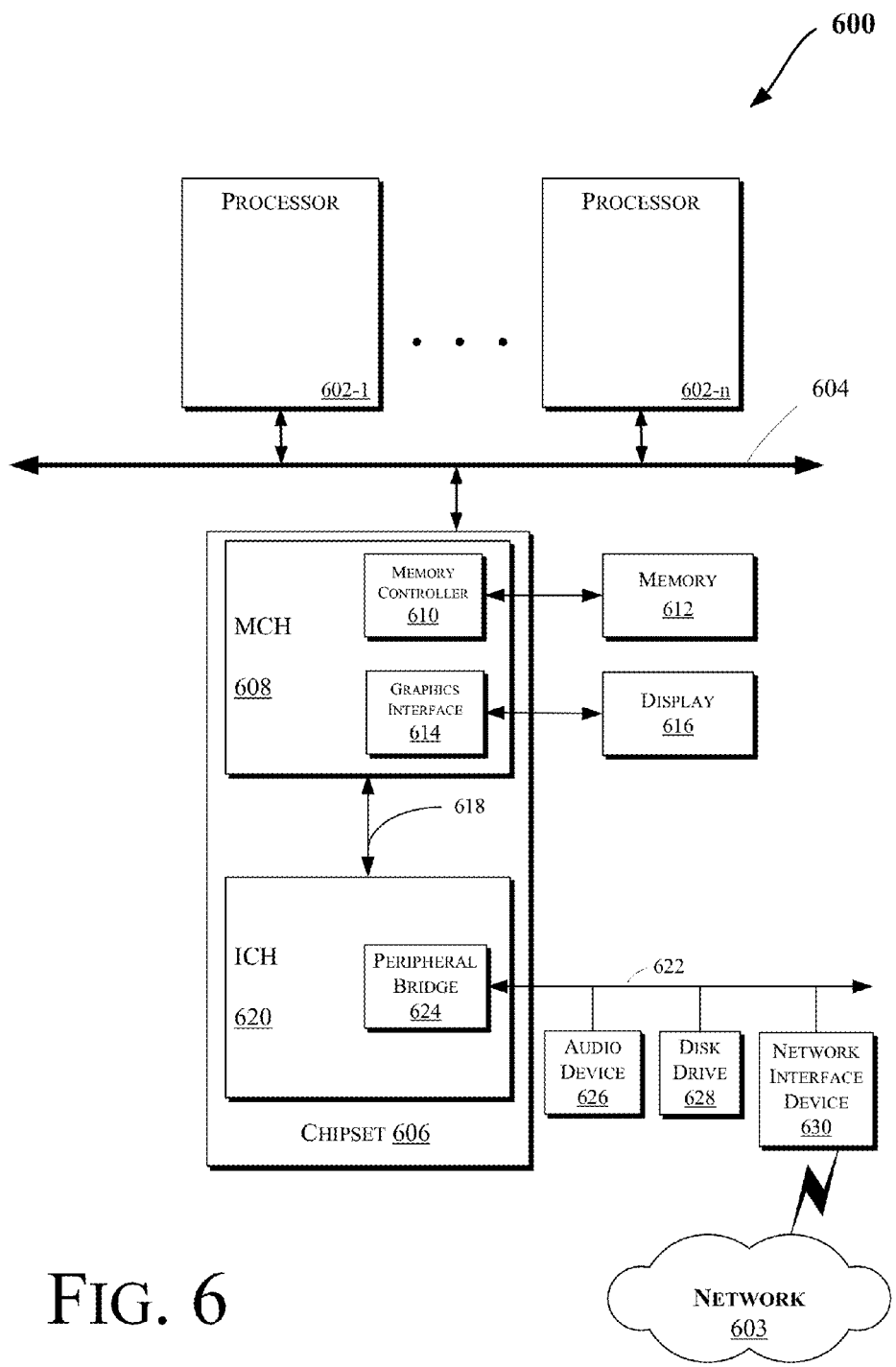
FIGS. 6-10 are schematic illustrations of electronic devices which may be adapted to implement a smart flexible display in accordance with some examples.

As described above, in some examples the electronic device may be embodied as a computer system. FIG. 6 illustrates a block diagram of a computing system 600 in accordance with an example. The computing system 600 may include one or more central processing unit(s) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an example, one or more of the processors 602 may be the same or similar to the processors 102 of FIG. 1. For example, one or more of the processors 602 may include the control unit 120 discussed with reference to FIGS. 1-3. Also, the operations discussed with reference to FIGS. 3-5 may be performed by one or more components of the system 600.

A chipset 606 may also communicate with the interconnection network 604. The chipset 606 may include a memory control hub (MCH) 608. The MCH 608 may include a memory controller 610 that communicates with a memory 612 (which may be the same or similar to the memory 130 of FIG. 1). The memory 412 may store data, including sequences of instructions, that may be executed by the processor 602, or any other device included in the computing system 600. In one example, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple processor(s) and/or multiple system memories.

The MCH 608 may also include a graphics interface 614 that communicates with a display device 616. In one example, the graphics interface 614 may communicate with the display device 616 via an accelerated graphics port (AGP). In an example, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the processor 602 and peripheral devices. Other types of topologies may be utilized. Also, multiple buses may communicate with the ICH 620, e.g., through multiple bridges or controllers. Moreover, other peripherals in communication with the ICH 620 may include, in various examples, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some examples. In addition, the processor 602 and one or more other components discussed herein may be combined to form a single chip (e.g., to provide a System on Chip (SOC)). Furthermore, the graphics accelerator 616 may be included within the MCH 608 in other examples.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
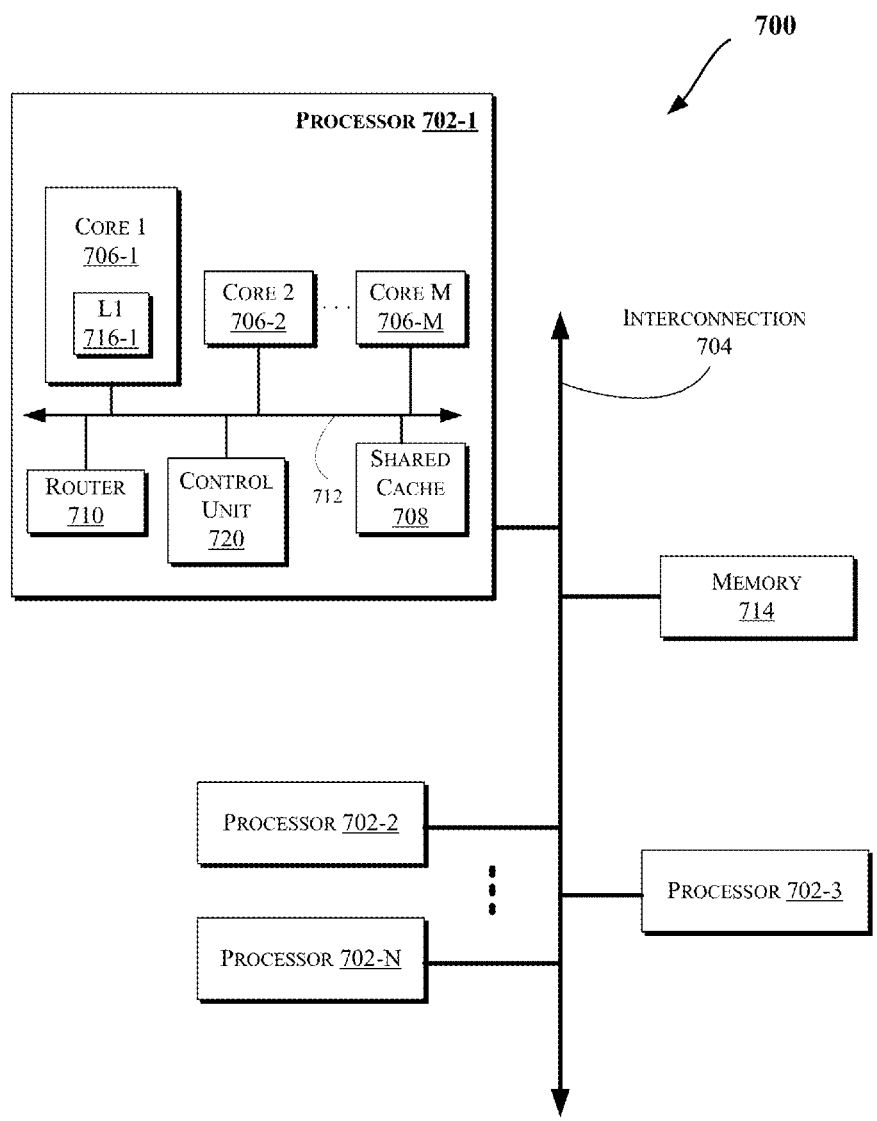

FIG. 7 illustrates a block diagram of a computing system 700, according to an example. The system 700 may include one or more processors 702-1 through 702-N (generally referred to herein as "processors 702" or "processor 702"). The processors 702 may communicate via an interconnection network or bus 704. Each processor may include various components some of which are only discussed with reference to processor 702-1 for clarity. Accordingly, each of the remaining processors 702-2 through 702-N may include the same or similar components discussed with reference to the processor 702-1.

In an example, the processor 702-1 may include one or more processor cores 706-1 through 706-M (referred to herein as "cores 706" or more generally as "core 706"), a shared cache 708, a router 710, and/or a processor control logic or unit 720. The processor cores 706 may be implemented on a single integrated circuit (IC) chip. Moreover, the chip may include one or more shared and/or private caches (such as cache 708), buses or interconnections (such as a bus or interconnection network 712), memory controllers, or other components.

In one example, the router 710 may be used to communicate between various components of the processor 702-1 and/or system 700. Moreover, the processor 702-1 may include more than one router 710. Furthermore, the multitude of routers 710 may be in communication to enable data routing between various components inside or outside of the processor 702-1.

The shared cache 708 may store data (e.g., including instructions) that are utilized by one or more components of the processor 702-1, such as the cores 706. For example, the shared cache 708 may locally cache data stored in a memory 714 for faster access by components of the processor 702. In an example, the cache 708 may include a mid-level cache (such as a level 2 (L2), a level 3 (L3), a level 4 (L4), or other levels of cache), a last level cache (LLC), and/or combinations thereof. Moreover, various components of the processor 702-1 may communicate with the shared cache 708 directly, through a bus (e.g., the bus 712), and/or a memory controller or hub. As shown in FIG. 7, in some examples, one or more of the cores 706 may include a level 1 (L1) cache 716-1 (generally referred to herein as "L1 cache 716"). In one example, the control unit 720 may include logic to implement the operations described above with reference to the memory controller 122 in FIG. 2.

Figure 8:
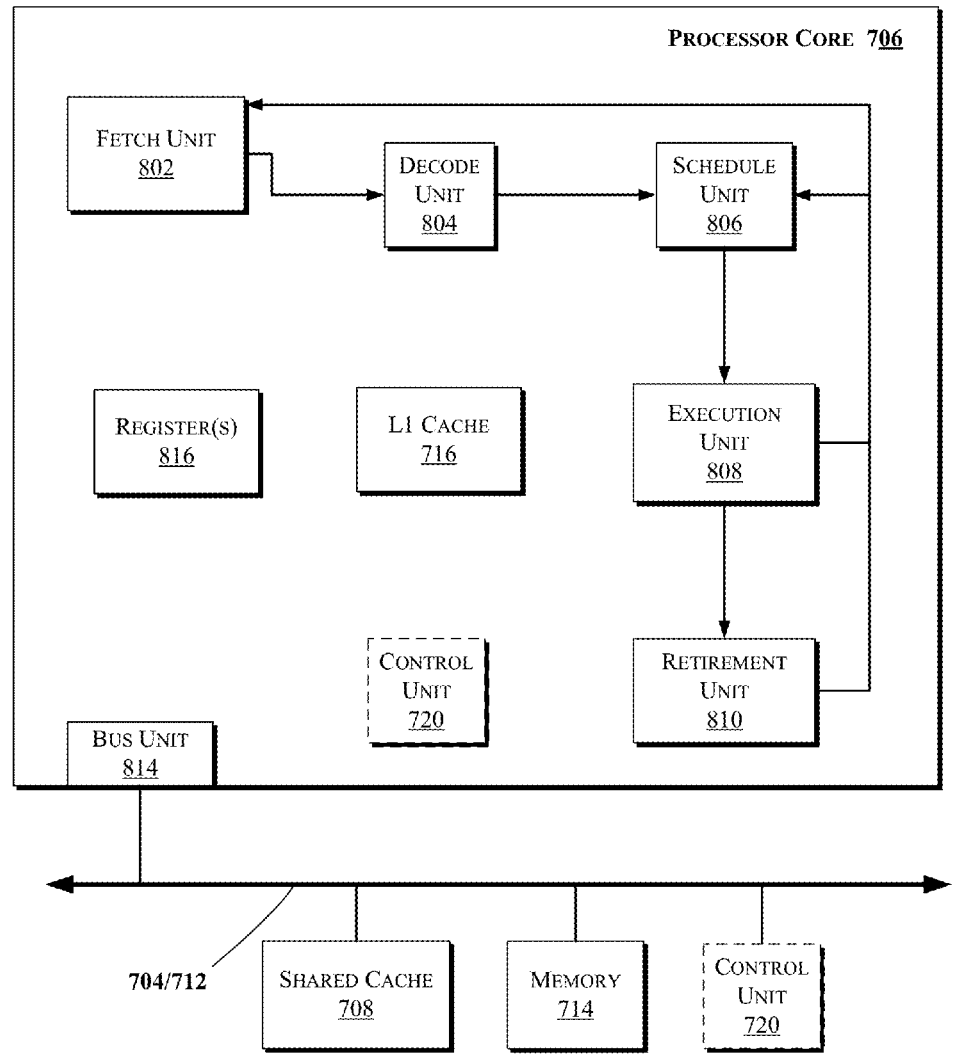

FIG. 8 illustrates a block diagram of portions of a processor core 706 and other components of a computing system, according to an example. In one example, the arrows shown in FIG. 8 illustrate the flow direction of instructions through the core 706. One or more processor cores (such as the processor core 706) may be implemented on a single integrated circuit chip (or die) such as discussed with reference to FIG. 7. Moreover, the chip may include one or more shared and/or private caches (e.g., cache 708 of FIG. 7), interconnections (e.g., interconnections 704 and/or 112 of FIG. 7), control units, memory controllers, or other components.

As illustrated in FIG. 8, the processor core 706 may include a fetch unit 802 to fetch instructions (including instructions with conditional branches) for execution by the core 706. The instructions may be fetched from any storage devices such as the memory 714. The core 706 may also include a decode unit 804 to decode the fetched instruction. For instance, the decode unit 804 may decode the fetched instruction into a plurality of uops (micro-operations).

Additionally, the core 706 may include a schedule unit 806. The schedule unit 806 may perform various operations associated with storing decoded instructions (e.g., received from the decode unit 804) until the instructions are ready for dispatch, e.g., until all source values of a decoded instruction become available. In one example, the schedule unit 806 may schedule and/or issue (or dispatch) decoded instructions to an execution unit 808 for execution. The execution unit 808 may execute the dispatched instructions after they are decoded (e.g., by the decode unit 804) and dispatched (e.g., by the schedule unit 806). In an example, the execution unit 808 may include more than one execution unit. The execution unit 808 may also perform various arithmetic operations such as addition, subtraction, multiplication, and/or division, and may include one or more an arithmetic logic units (ALUs). In an example, a co-processor (not shown) may perform various arithmetic operations in conjunction with the execution unit 808.

Further, the execution unit 808 may execute instructions out-of-order. Hence, the processor core 706 may be an out-of-order processor core in one example. The core 706 may also include a retirement unit 810. The retirement unit 810 may retire executed instructions after they are committed. In an example, retirement of the executed instructions may result in processor state being committed from the execution of the instructions, physical registers used by the instructions being de-allocated, etc.

The core 706 may also include a bus unit 714 to enable communication between components of the processor core 706 and other components (such as the components discussed with reference to FIG. 8) via one or more buses (e.g., buses 804 and/or 812). The core 706 may also include one or more registers 816 to store data accessed by various components of the core 706 (such as values related to power consumption state settings).

Furthermore, even though FIG. 7 illustrates the control unit 720 to be coupled to the core 706 via interconnect 812, in various examples the control unit 720 may be located elsewhere such as inside the core 706, coupled to the core via bus 704, etc.

Figure 9:
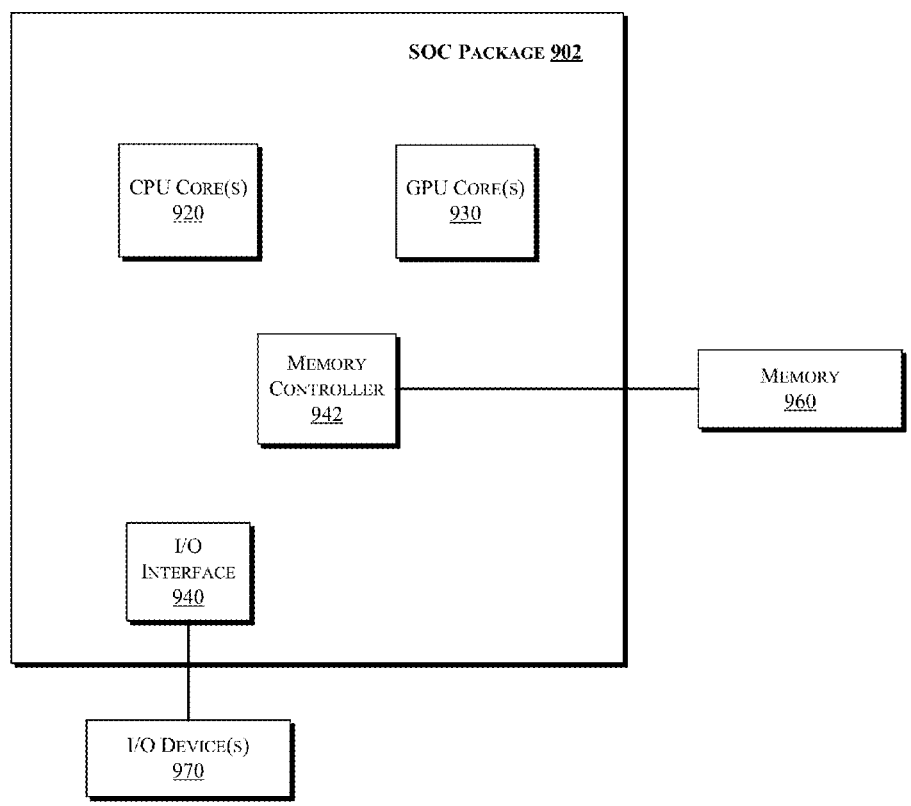

In some examples, one or more of the components discussed herein can be embodied as a System On Chip (SOC) device. FIG. 9 illustrates a block diagram of an SOC package in accordance with an example. As illustrated in FIG. 9, SOC 902 includes one or more processor cores 920, one or more graphics processor cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 902 may include one or more other components, e.g., as discussed with reference to the other figures herein. In one example, SOC package 902 (and its components) is provided on one or more Integrated Circuit (IC) die, e.g., which are packaged into a single semiconductor device.

As illustrated in FIG. 9, SOC package 902 is coupled to a memory 960 (which may be similar to or the same as memory discussed herein with reference to the other figures) via the memory controller 942. In an example, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device(s) 970 may include one or more of a keyboard, a mouse, a touchpad, a display, an image/video capture device (such as a camera or camcorder/video recorder), a touch surface, a speaker, or the like.

Figure 10:
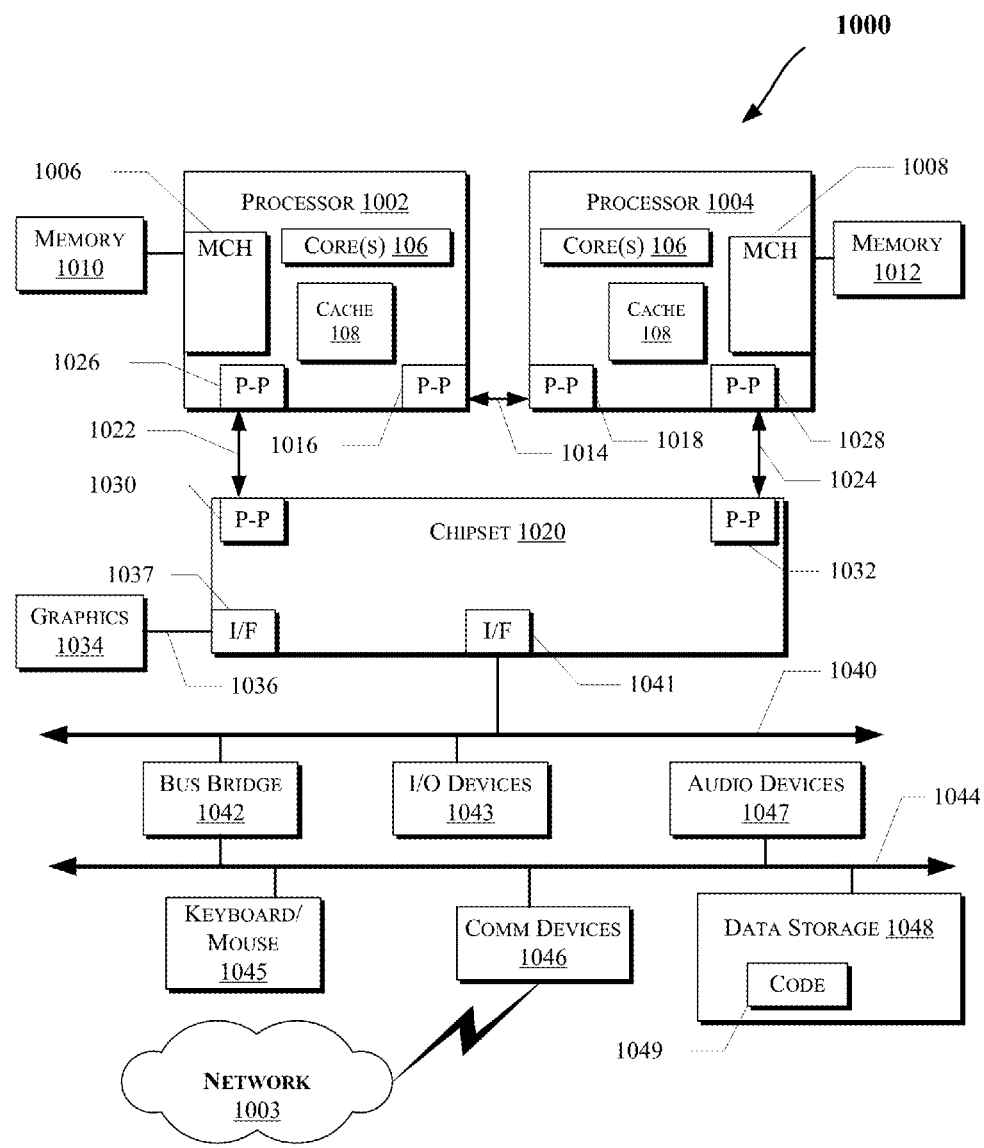

FIG. 10 illustrates a computing system 1000 that is arranged in a point-to-point (PtP) configuration, according to an example. In particular, FIG. 10 shows a system where processors, memory, and input/output devices are interconnected by a number of point-to-point interfaces. The operations discussed with reference to FIG. 2 may be performed by one or more components of the system 1000.

As illustrated in FIG. 10, the system 1000 may include several processors, of which only two, processors 1002 and 1004 are shown for clarity. The processors 1002 and 1004 may each include a local memory controller hub (MCH) 1006 and 1008 to enable communication with memories 1010 and 1012. MCH 1006 and 1008 may include the memory controller 120 and/or logic 125 of FIG. 1 in some examples.

In an example, the processors 1002 and 1004 may be one of the processors 702 discussed with reference to FIG. 7. The processors 1002 and 1004 may exchange data via a point-to-point (PtP) interface 1014 using PtP interface circuits 1016 and 1018, respectively. Also, the processors 1002 and 1004 may each exchange data with a chipset 1020 via individual PtP interfaces 1022 and 1024 using point-to-point interface circuits 1026, 1028, 1030, and 1032. The chipset 1020 may further exchange data with a high-performance graphics circuit 1034 via a high-performance graphics interface 1036, e.g., using a PtP interface circuit 1037.

As shown in FIG. 10, one or more of the cores 106 and/or cache 108 of FIG. 1 may be located within the processors 1004. Other examples, however, may exist in other circuits, logic units, or devices within the system 1000 of FIG. 10. Furthermore, other examples may be distributed throughout several circuits, logic units, or devices illustrated in FIG. 10.

The chipset 1020 may communicate with a bus 1040 using a PtP interface circuit 1041. The bus 1040 may have one or more devices that communicate with it, such as a bus bridge 1042 and I/O devices 1043. Via a bus 1044, the bus bridge 1043 may communicate with other devices such as a keyboard/mouse 1045, communication devices 1046 (such as modems, network interface devices, or other communication devices that may communicate with the computer network 1003), audio I/O device, and/or a data storage device 1048. The data storage device 1048 (which may be a hard disk drive or a NAND flash based solid state drive) may store code 1049 that may be executed by the processors 1004.

The following examples pertain to further examples.

Example 1 is display for an electronic device, comprising a flexible emissive projection display (EPD) layer, and an electroactive polymer (EAP) structure coupled to the EPD layer.

In Example 2, the subject matter of Example 1 can optionally include an arrangement in which the EPD layer is disposed between a first EAP layer and a second EAP layer.

In Example 3, the subject matter of any one of Examples 1-2 can optionally include an arrangement in which the first EAP layer has a positive electrical bias and the second EAP layer has a negative electrical bias.

In Example 4, the subject matter of any one of Examples 1-3 can optionally include an arrangement in which a first protective layer disposed adjacent the first EAP layer and a second protective layer disposed adjacent the second EAP layer.

In Example 5, the subject matter of any one of Examples 1-4 can optionally an arrangement in which the EAP structure comprises a first EAP layer, a second EAP layer, and a dielectric layer disposed between the first EAP layer and the second EAP layer.

In Example 6, the subject matter of any one of Examples 1-5 can optionally include an arrangement in which the first EAP layer has a positive electrical bias and the second EAP layer has a negative electrical bias.

In Example 7, the subject matter of any one of Examples 1-6 can optionally include an arrangement in which a first protective layer disposed adjacent the first EAP layer.

In Example 8, the subject matter of any one of Examples 1-7 can optionally include a strain gauge disposed proximate at least one of the first EAP layer or the second EAP layer.

Example 9 is an electronic device, comprising a base section and a display connectable to the base section and comprising a flexible emissive projection display (EPD) layer and an electroactive polymer (EAP) structure coupled to the EPD layer.

In Example 10, the subject matter of Example 9 can optionally include an arrangement in which the EPD layer is disposed between a first EAP layer and a second EAP layer.

In Example 11, the subject matter of any one of Examples 9-10 can optionally include an arrangement in which the first EAP layer has a positive electrical bias and the second EAP layer has a negative electrical bias.

In Example 12, the subject matter of any one of Examples 9-11 can optionally include an arrangement in which a first protective layer disposed adjacent the first EAP layer and a second protective layer disposed adjacent the second EAP layer.

In Example 13, the subject matter of any one of Examples 9-12 can optionally an arrangement in which the EAP structure comprises a first EAP layer, a second EAP layer, and a dielectric layer disposed between the first EAP layer and the second EAP layer.

In Example 14, the subject matter of any one of Examples 9-13 can optionally include an arrangement in which the first EAP layer has a positive electrical bias and the second EAP layer has a negative electrical bias.

In Example 15, the subject matter of any one of Examples 9-14 can optionally include an arrangement in which a first protective layer disposed adjacent the first EAP layer.

In Example 16, the subject matter of any one of Examples 9-15 can optionally include a strain gauge disposed proximate at least one of the first EAP layer or the second EAP layer.

In Example 17, the subject matter of any one of Examples 9-16 can optionally include a projection source in the base section, wherein the projection source is positioned to project radiation onto the display.

In Example 18, the subject matter of any one of Examples 9-17 logic, at least partially including hardware logic, configured to receive a first signal and in response to the first signal, to direct an electrical current to at least a portion of the EAP structure on the display.

In Example 19, the subject matter of any one of Examples 9-18 can optionally include an arrangement in which the electrical current causes the display to open.

In Example 20, the subject matter of any one of Examples 9-19 can optionally include an arrangement in which the electrical current causes the display to open.

In Example 21, the subject matter of any one of Examples 9-20 can optionally include an arrangement in which the electrical current causes the display to expand in at least one dimension.

In Example 22, the subject matter of any one of Examples 9-21 can optionally include an arrangement in which the electrical current causes the display to contract in at least one dimension.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A display for an electronic device, comprising:
a flexible emissive projection display (EPD) layer comprising a fluorescent screen structure which, when illuminated by an optical imaging system, is to form an image on the fluorescent screen structure; and
an electroactive polymer (EAP) structure coupled to the EPD layer.

2. The display of claim 1, wherein:
the EAP structure comprises a first EAP layer and a second EAP layer.

3. The display of claim 2, wherein:
the first EAP layer has a positive electrical bias; and
the second EAP layer has a negative electrical bias.

4. The display of claim 2, further comprising:
a first protective layer disposed adjacent the first EAP layer; and
a second protective layer disposed adjacent the second EAP layer.

5. The display of claim 1, wherein the EAP structure comprises:
a first EAP layer;
a second EAP layer; and
a dielectric layer disposed between the first EAP layer and the second EAP layer.

6. The display of claim 5, wherein:
the first EAP layer has a positive electrical bias; and
the second EAP layer has a negative electrical bias.

7. The display of claim 5, further comprising:
a first protective layer disposed adjacent the first EAP layer.

8. The display of claim 1, further comprising:
a strain gauge disposed proximate the EAP structure.

9. An electronic device, comprising:
a base section; and
a display connectable to the base section and comprising:
a flexible emissive projection display (EPD) layer comprising a fluorescent screen structure which, when illuminated by an optical imaging system, is to form an image on the fluorescent screen structure; and
an electroactive polymer (EAP) structure coupled to the EPD layer.

10. The electronic device of claim 9, wherein:
the EAP structure comprises a first EAP layer and a second EAP layer.

11. The electronic device of claim 10, wherein:
the first EAP layer has a positive electrical bias; and
the second EAP layer has a negative electrical bias.

12. The electronic device of claim 10, further comprising:
a first protective layer disposed adjacent the first EAP layer; and
a second protective layer disposed adjacent the second EAP layer.

13. The electronic device of claim 9, wherein the EAP structure comprises:
a first EAP layer;
a second EAP layer; and
a dielectric layer disposed between the first EAP layer and the second EAP layer.

14. The electronic device of claim 13, wherein:
the first EAP layer has a positive electrical bias; and
the second EAP layer has a negative electrical bias.

15. The electronic device of claim 13, further comprising:
a first protective layer disposed adjacent the first EAP layer.

16. The electronic device of claim 9, further comprising:
a strain gauge disposed proximate the EAP structure r.

17. The electronic device of claim 9, further comprising:
a projection source in the base section, wherein the projection source is positioned to project radiation onto the display.

18. The electronic device of claim 9, further comprising a controller comprising:
logic, at least partially including hardware logic, configured to:
receive a first signal; and
in response to the first signal, to direct an electrical current to at least a portion of the EAP structure on the display.

19. The electronic device of claim 18, wherein the electrical current causes the display to open.

20. The electronic device of claim 18, wherein the electrical current causes the display to close.

21. The electronic device of claim 18, wherein the electrical current causes the display to expand in at least one dimension.

22. The electronic device of claim 18, wherein the electrical current causes the display to contract in at least one dimension.

* * * * *